(12) United States Patent
Mariotti et al.

(10) Patent No.: US 8,313,291 B2
(45) Date of Patent: Nov. 20, 2012

(54) TURBINE INLET GUIDE VANE WITH SCALLOPED PLATFORM AND RELATED METHOD

(75) Inventors: Massimiliano Mariotti, Pieve a Nievole (IT); Craig Allen Bielek, Simpsonville, SC (US); Michele D'Ercole, Florence (IT); Luciano Mei, Florence (IT)

(73) Assignee: Nuovo Pignone, S.p.A., Florence (IT)

( * ) Notice: Subject to any disclaimer, the term of this patent is extended or adjusted under 35 U.S.C. 154(b) by 1052 days.

(21) Appl. No.: 11/959,928

(22) Filed: Dec. 19, 2007

(65) Prior Publication Data

US 2009/0162193 A1    Jun. 25, 2009

(51) Int. Cl.
*F01D 9/04*     (2006.01)
(52) U.S. Cl. .................. 415/210.1; 415/914; 416/193 A
(58) Field of Classification Search ............... 416/193 A
See application file for complete search history.

(56) References Cited

U.S. PATENT DOCUMENTS

| | | | |
|---|---|---|---|
| 6,017,186 A * | 1/2000 | Hoeger et al. | 415/181 |
| 6,511,294 B1 * | 1/2003 | Mielke et al. | 416/193 A |
| 6,561,761 B1 * | 5/2003 | Decker et al. | 415/173.1 |
| 6,705,834 B1 * | 3/2004 | Jacobsson | 416/193 A |
| 7,690,890 B2 * | 4/2010 | Aotsuka et al. | 415/191 |

FOREIGN PATENT DOCUMENTS

WO    WO 2006033407 A1 *    3/2006

* cited by examiner

*Primary Examiner* — Richard Edgar
(74) *Attorney, Agent, or Firm* — GE Global Patent Operation

(57) ABSTRACT

A nozzle segment is disclosed that includes a first platform configured to be connected with a casing of a gas turbine engine, a second platform configured to be connected with the casing, the second platform being disposed apart from the first platform in a radial direction of the gas turbine engine, and a plurality of blades disposed between the first and second platforms and connected thereto, a portion of an inside surface of the first platform or the second platform being scalloped so as to increase a throat area of the nozzle segment in order to increase the nozzle segment's mass flow rate handling capability.

10 Claims, 4 Drawing Sheets

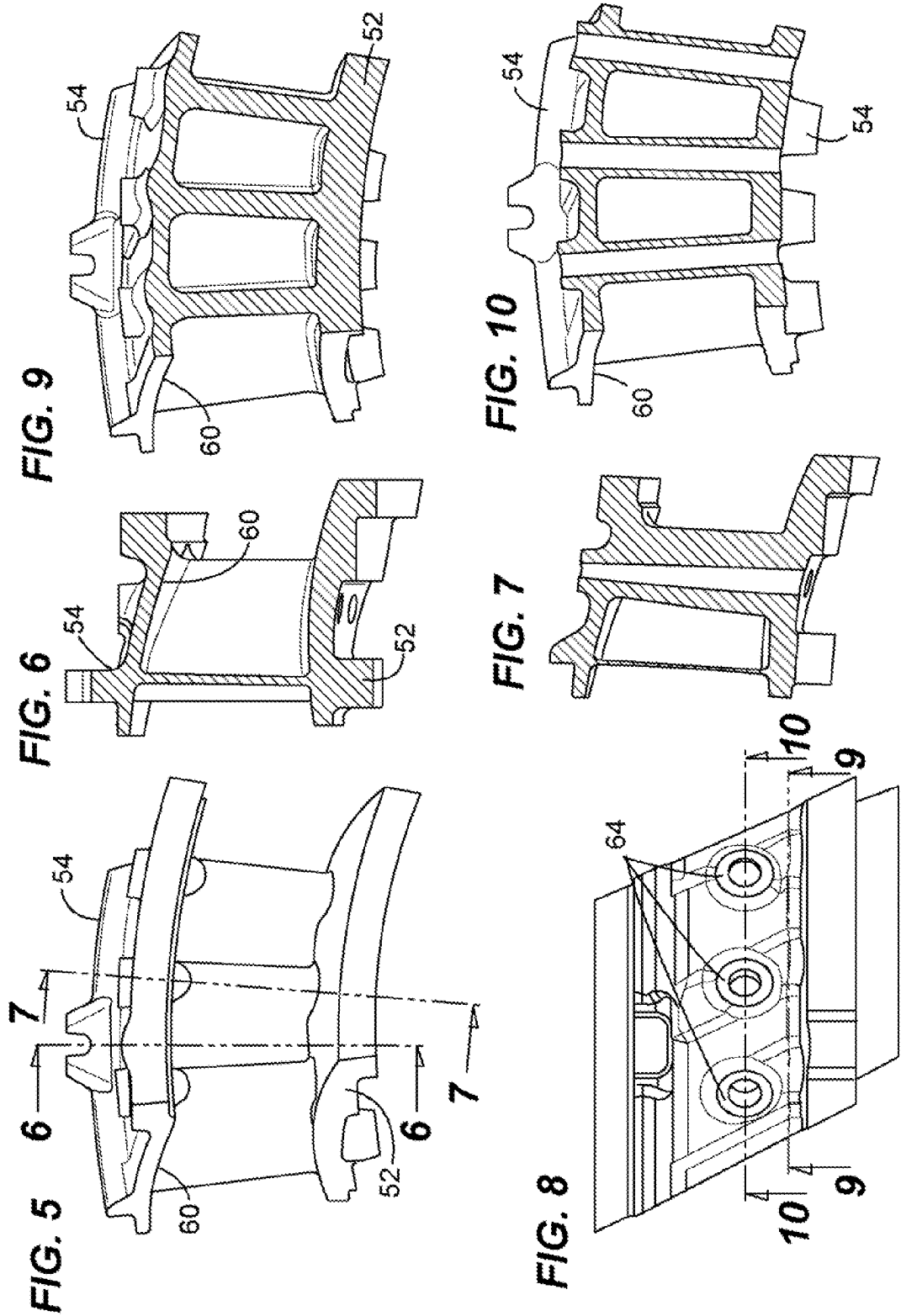

TURBINE INLET GUIDE VANE WITH SCALLOPED PLATFORM AND RELATED METHOD

BACKGROUND OF THE INVENTION

1. Field of the Invention

The embodiments disclosed relate generally to gas turbine engines and, more particularly, to scalloped turbine inlet guide vanes with enhanced mass flow handling capabilities and methods to increase the mass flow rate in gas turbine engines.

2. Description of the Related Art

In a gas turbine the pressure of the air ingested into the engine is increased in a compressor before the burning of fuel in the engine's combustor significantly increases its energy level, generating gases at elevated temperatures. Then, these hot gases exiting the combustor are first turned from the axial flow direction into a desired orientation by a set of inlet guide vanes or nozzles before expanding through a series of rotors and stators of a turbine, thereby producing power to drive the compressor, which is connected to the turbine by a mechanical shaft. In an aircraft engine, the remaining available thermal power of the hot exhaust gases is converted into kinetic power in the engine's nozzle, thus producing thrust to power the aircraft. In a power generating gas turbine, further expansion of the hot gases through a power turbine generates electrical power by a generator connected to the power turbine by the same or another mechanical shaft. Those of ordinary skill in the applicable arts appreciate that, for a given compressor pressure ratio and turbine inlet temperature limit, the output power of these gas turbines increases as the mass flow rate of gases flowing there through increases. However, one of the limiting factors controlling the mass flow through the engine is the throat or minimum area of the inlet guide vanes, which, under normal operating conditions, operate under choked flow conditions.

FIG. 1 illustrates a conventional inlet guide vane or nozzle segment 10 that includes a plurality of blades or airfoils 12, each having a leading edge 14, a trailing edge 16, a suction or convex side 18, and a pressure or concave side 20. As know in the art, inlet guide vanes in gas turbine engines are normally composed of a plurality of vane segments 10 disposed next to each other around the engine shaft. These inlet guide vanes and nozzle segments 10 may include two or more blades per segment and the number of blades in a segment in no way limits the subject matter being disclosed herein. As shown in FIG. 1, the plurality of blades 12 is disposed between an inner platform 22 and an outer platform 24. The flow path for the hot combustion gases through the conventional guide vane or nozzle segment 10 is defined on one side by the convex side of a blade 12, on the other side by the concave side of an adjacent blades 12, on the top by an inner surface 26 of the outer platform 24, and on the bottom by an inner surface 28 of the inner platform 22. As shown in FIG. 1, a flow path profile 30 of the conventional guide vane or nozzle segment 10 is substantially a straight line, defining a throat area 32 towards the exit of the device. In a conventional engine, enlargement of the throat area 32 of the inlet guide vane or nozzle segment 10 has been accomplished by material removal from either the suction side or the pressure side of each blade 12 in the region near the trailing edge 16. However, as known in the art, the removal of blade material at the noted locations is undesirable because of both the alteration of the velocity triangle of the flow exiting the inlet guide vane or nozzle segment 10 and the generation of wake turbulence, both of which cause a deterioration of performance and a decrease in the overall efficiency of the engine.

It would therefore be desirable to develop an inlet guide vane or nozzle segments that will allow for expedited redesign so as to increase flow function and, therefore, optimize performance of new or existing gas turbines with negligible or no alteration of velocity triangles and wake turbulence, while reducing the overall development lead time and minimizing development and fabrication risks and associated costs.

BRIEF SUMMARY OF THE INVENTION

One or more of the above-summarized needs or others known in the art are addressed by nozzle segments that include a first platform configured to be connected with a casing of a gas turbine engine; a second platform configured to be connected with the casing, the second platform being disposed apart from the first platform in a radial direction of the gas turbine engine; and a plurality of blades disposed between the first and second platforms and connected thereto, a portion of an inside surface of the first platform and/or the second platform is scalloped so as to increase a throat area of the nozzle segment.

Methods for increasing a gas mass flow rate through a nozzle segment are also within the scope of the subject matter disclosed herein. Such methods include the providing of a nozzle segment having a plurality of blades disposed between inner and outer platforms and the removing of material from a portion of an inside surface of the first platform and/or from an inside surface of the second platform so as to form a scalloped region thereon to increase a throat area of the nozzle segment.

The above brief description sets forth features of the various embodiments of the present invention in order that the detailed description that follows may be better understood, and in order that the present contributions to the art may be better appreciated. There are, of course, other features of the invention that will be described hereinafter and which will be for the subject matter of the appended claims.

In this respect, before explaining several embodiments of the invention in detail, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

Further, the purpose of the foregoing Abstract is to enable a patent examiner and/or the public generally, and especially scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 5 illustrates a rear view of the inlet guide vane or nozzle of FIG. 2;

FIG. 6 illustrates a cross-sectional view taken along line 6-6 of FIG. 5;

FIG. 7 illustrates a cross-sectional view taken along line 7-7 of FIG. 5;

FIG. 8 illustrates a top view of the inlet guide vane or nozzle of FIG. 2;

FIG. 9 illustrates a cross-sectional view taken along line 9-9 of FIG. 8;

FIG. 10 illustrates another cross-sectional view taken along line 10-10 of FIG. 8.

DETAILED DESCRIPTION OF THE PREFERRED EMBODIMENTS

Figure 1:
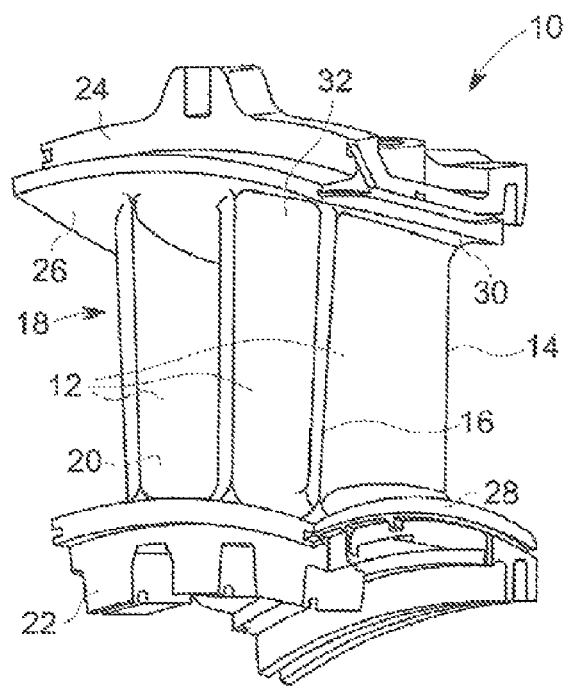
FIG. 1 illustrates a conventional inlet guide vane or nozzle.

The embodiments disclosed relate generally to gas turbine engines and, more particularly, to scalloped turbine inlet guide vanes with enhanced mass flow handling capabilities and to methods of increasing the mass flow rate through a gas turbine engine. As used herein throughout the expression scalloped when applied to an existing inlet guide vane or nozzle refers to a method of increasing the throat area by removing material from the inner or outer platform between airfoils, thus increasing the annular flow area. As applied to a new inlet guide vane or nozzle, the expression scalloped refers to a method of fabrication in which the shape of the inner or outer platform between airfoils is shaped so as to increase the annular flow area of the nozzle or guide vane. Inlet guide vane segments as well as turbine nozzle segments located downstream of the inlet guide vanes with increased throat area achieved by scalloped inner and/or outer platforms offer the advantage of being easier to be applied and does not require any modification of the casting process, leaving the main features of the casting unchanged. The development risk is also reduced since velocity triangles remain unchanged and gas path wakes are not affected. Both new vanes and/or nozzles, for which a new casting tooling may be developed, and existing vanes and/or nozzles, whose outer and/or inner platforms can be remachined to increase the flow function of the vane and/or nozzle to a desired value without the need for developing new hardware, are within the scope of the subject matter disclosed.

Those of ordinary skill in the applicable arts will appreciate, after review of the subject matter disclosed herein, that a quick modification of an existing gas turbine nozzles design to increase flow function, and therefore optimize performances, is provided, thus reducing overall development lead-time and minimizing development and fabrication risks and associated costs. In addition, those of ordinary skill will appreciate that the various embodiments disclosed herein of inlet guide vanes or nozzles with scalloped inner and/or outer platform are not dependent on each other, i.e., each may be implemented without the other and various combinations are within the scope of the subject matter disclosed, as it will become apparent. Thus the disclosed vanes and nozzles allow for expedited redesign to increase flow function and, therefore, optimize performance of new or existing gas turbines with negligible or no alteration of velocity triangles and wake turbulence and lightened outer platform to reduce airfoil stress level, while reducing the overall development lead time and minimizing development and fabrication risks and associated costs. Referring now to the drawings, wherein like reference numerals designate identical or corresponding parts throughout the several views, several embodiments of the improved vane and nozzle segments will be described.

Figure 2:
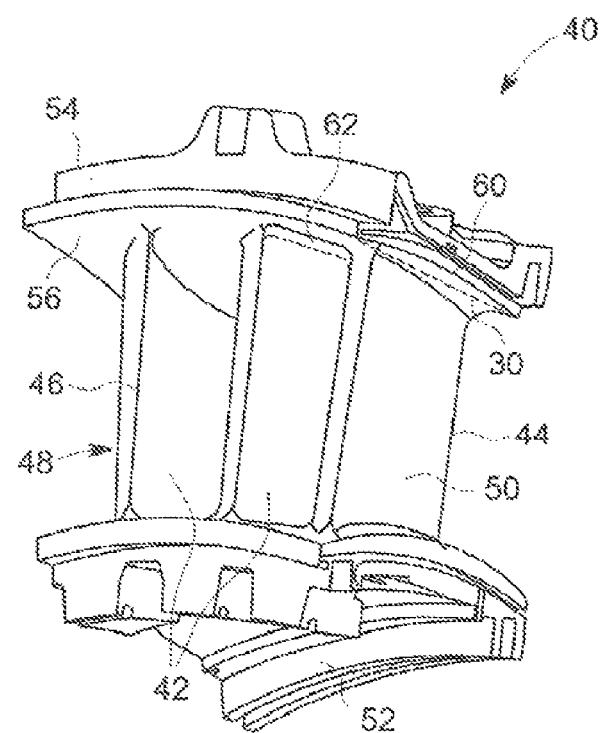
FIG. 2 illustrates a perspective view of an inlet guide vane or nozzle according to one embodiment of the subject matter disclosed.
Figure 3:
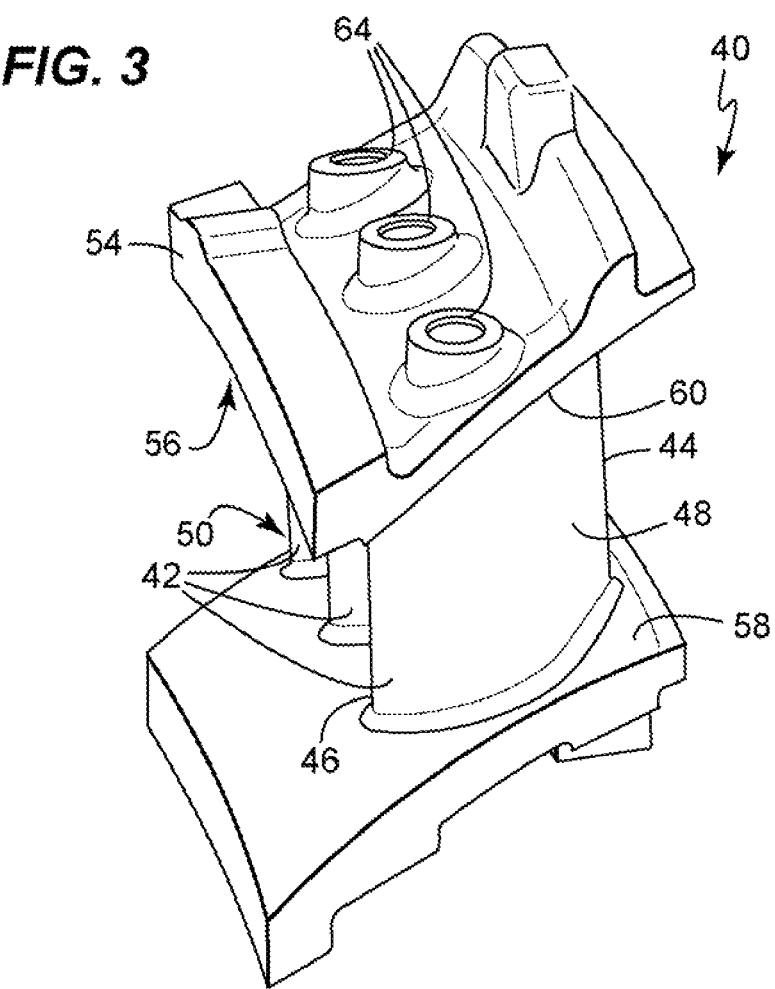
FIG. 3 illustrates another perspective view of the inlet guide vane or nozzle of FIG. 2.
Figure 4:
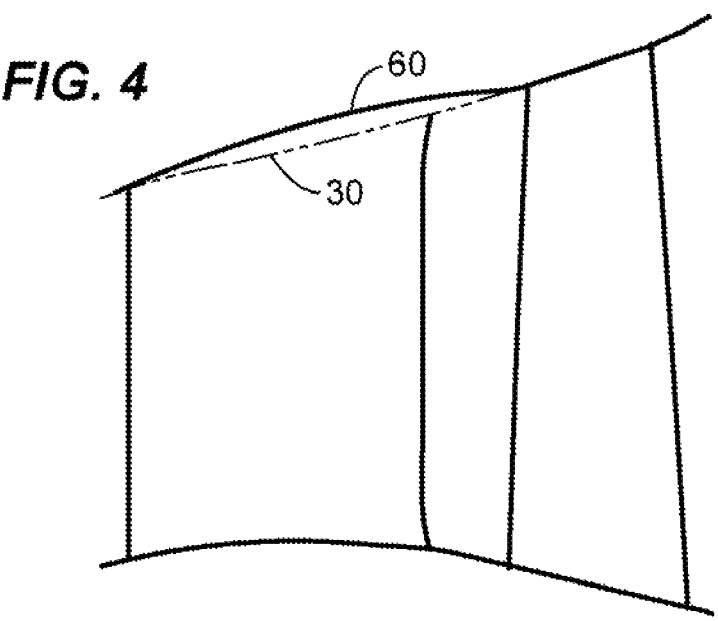
FIG. 4 illustrates a side view of the inlet guide vane or nozzle of FIG. 2.

FIGS. 2-10 illustrates various exemplary embodiments of the subject matter disclosed. FIG. 2 illustrates a perspective view of an inlet guide vane or nozzle segment 40 according to one embodiment of the subject matter disclosed. FIG. 3 illustrates another perspective view of the inlet guide vane or nozzle segment 40. FIGS. 4, 5, and 8 illustrate a side view, a rear view, and a top view, respectively, of the inlet guide vane or nozzle segment 40. FIGS. 6 and 7 illustrate cross-sectional views taken along lines 6-6 and 7-7, respectively, of FIG. 5. And, FIGS. 9 and 10 illustrate cross-sectional views taken along lines 9-9 and 10-10 and 7-7, respectively, of FIG. 5.

As shown in FIGS. 2 and 3, the inlet guide vane or nozzle segment 40 includes a plurality of blades or airfoils 42, each having a leading edge 44, a trailing edge 46, a suction or convex side 48, and a pressure or concave side 50. As shown in FIGS. 2 and 3, the plurality of blades 42 is disposed between an inner platform 52 and an outer platform 54. The flow path for the hot combustion gases through the inlet guide vane or nozzle segment 40 is defined on one side by the convex side of a blade 42, on the other side by the concave side an adjacent blades 42, on the top by an inner surface 56 of the outer platform 54, and on the bottom by an inner surface 56 of the inner platform 52. As shown in FIGS. 2 and 3, in the exemplary inlet guide vane or nozzle 40 the inner surface 56 of the outer platform 54 is scalloped outwardly along a radial direction so as to form a scalloped gas flow path 60.

The scalloped outer platform 54 allows the throat area (not identified) to be increased. As understood by those of ordinary skill, normally, the throat area is defined by a plane extending perpendicularly from the suction side 48 of a blade 42 to the trailing edge 46 on the pressure side 50 of an adjacent blade 42. For comparison purposes the straight flow path profile 30 of the conventional inlet guide vane 10 of FIG. 1 is shown as a dashed line in FIG. 2 so as to illustrate how the throat area of the vane segment 40 is increased. The region 62 between the dashed line of FIG. 2 and the outer platform 54 represents the increase in radial annular area with the scalloped platform 54, leading to the disclosed increase in throat area.

As shown in FIG. 3, each scalloped nozzle segment 40 may include three bridge access holes 64 to allow for material feeding during the casting thereof. When compared to the conventional nozzle segment 10 of FIG. 1, the scalloped nozzle segment 40 according the disclosed embodiment will provide for an increased airflow rate of approximately 3%. The scalloped out platform of the nozzle segment 40 of FIGS. 2 and 3 is also illustrated in the side view of the nozzle segment 40 in FIG. 4. Again, for comparison purposes, the dashed line in that figure shows the flow path profile 30 of the conventional nozzle segment of FIG. 1.

Those of ordinary skill in the applicable arts will, after consideration of the subject matter disclosed herein, appreciate that the nozzle segment 40 of FIGS. 2-10 incorporates a lighter outer platform to reduce airfoils stresses, the scalloped gas path outer platform surfaces provide an increase in the nozzle segment throat area without the need to design new airfoil profiles since original airfoils are only required to be lengthened to extend through the scalloped region of the outer platform 54. Without redesigning the airfoils, any potential negative effect on the downstream airfoils (different incidence or vortices) is avoided, making the new gas path design substantially trouble free. In addition, not only new scalloped nozzle segments can be developed, for which a new casting tooling may be required, but also existing nozzle segments, whose outer and/or inner platforms can be remachined to increase the nozzle's flow function to the desired value without the need for developing new hardware.

As shown in the enclosed illustrations, although different regions of the outer platform may be scalloped, an outer platform gas path surface with localized scallops in the region around the minimum throat area section is favored. In addition, the outer platform scallop was optimized to match the high-pressure turbine gas path, thus ensuring that the increase in flow area did not generate any loss in aerodynamic efficiency. Thus, an inlet guide vane that includes the scalloped nozzle segments 40 increases the geometric flow area accordingly to cycle deck requirements without the necessity to modify airfoil profiles. Also, as noted, the redesigned outer platform and its lightened thickness provide the necessary flexibility to reduce stresses on airfoil trailing edges.

Figure 11:
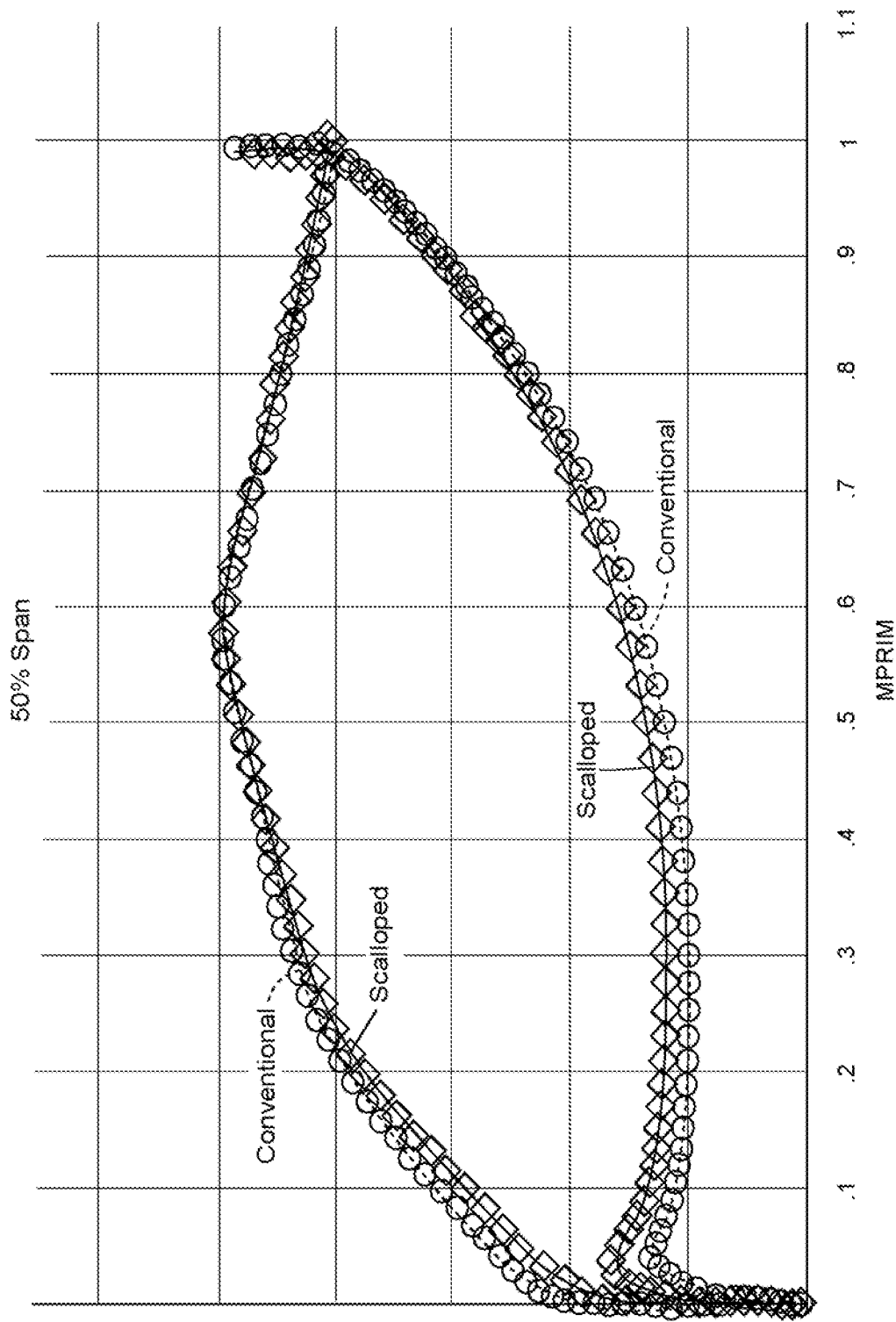
FIG. 11 illustrates the variation of surface Mach number for a nozzle with and without the improvements of the subject matter disclosed.

FIGS. 5-10 illustrates various views of the inlet nozzle segment 40. In the various views illustrated, one can observe, among other advantageous features appreciated by those of ordinary skill in the applicable arts, the altered flow path 60 made possible by the scalloped out platform 54. As previously explained, although not illustrated in FIGS. 5-10, the scalloping of the inner platform 52 is also with the scope of the subject matter disclosed herein. The improved scalloped nozzle segments disclosed in FIGS. 2-10 have been shown as feasible by tests on a gas turbine engine incorporating the same. Performance maps have been generated to demonstrate the flow function increase reached by the design and its negligible effect on downstream airfoils. FIG. 11 illustrates the variation of gas velocity in terms of Mach number for a downstream bucket for a case of a nozzle without the disclosed improvements and for a case of a nozzle with the disclosed improvements. Although nozzles including the subject matter disclosed are configured to increase the mass flow rate there through, as explained hereinabove, as shown in FIG. 11, negligible changes in terms of velocity between a conventional flow path and a scalloped flow path, indicating minimum losses generated by a scalloped platform.

Methods for increasing a gas mass flow rate through a nozzle segment are also within the scope of the subject matter disclosed herein. Such methods include the providing of a nozzle segment including a first platform configured to be connected with a casing of a gas turbine engine, a second platform configured to be connected with the casing disposed apart from the first platform in a radial direction of the gas turbine engine; and a plurality of blades disposed between the first and second platforms and connected thereto, each blade having a leading edge, a trailing edge, a suction or convex side, and a pressure or concave side, and the removing of material from a portion of an inside surface of the first platform and/or from an inside surface of the second platform so as to form a scalloped region thereon to increase a throat area of the nozzle segment. In these methods, the increase in the throat area is an increase in a radial annulus area of the throat and the distance from blade to blade remains unchanged and the nozzle segment may include either an inlet guide vane or a turbine nozzle segment to be disposed downstream of the inlet guide vane in a gas turbine. The increase in throat area is such that the nozzle segment is configured to handle a 3% increase in a gas mass flow rate through the nozzle segment as compared to the nozzle segment without the throat area increase. The throat area is defined by a plane extending perpendicularly from the suction side of a blade to the trailing edge on the pressure side of an adjacent blade.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. A nozzle segment, comprising:
   an inner platform configured to be connected with a casing of a gas turbine engine;
   an outer platform configured to be connected with the casing, the outer platform being disposed apart from the inner platform in a radial direction of the gas turbine engine; and
   a plurality of blades disposed between the inner and outer platforms and connected thereto, each blade having a leading edge, a trailing edge, a suction side, and a pressure side, wherein one of an inside surface of the inner platform or an inside surface of the outer platform is scalloped outwardly along a radial direction extending from the leading edge of the blade past the trailing edge of the blade and into a portion of the inside surface of the inner or outer platform that is proximate the trailing edge of the blade to form a scalloped region, wherein the scalloped region extends from the pressure side of one of the plurality of blades to the suction side of an adjacent one of the plurality of blades in a uniform line having end points substantially equidistant from the rotation axis of the nozzle so as to increase a throat area of the nozzle segment;
   wherein the blades extend through the scalloped region to the inner platform and the outer platform.

2. The nozzle segment according to claim 1, wherein the increase in the throat area is an increase in a radial annulus area of the throat and a distance from blade to blade remains unchanged.

3. The nozzle segment according to claim 1, wherein the nozzle segment is an inlet guide vane segment.

4. The nozzle segment according to claim 1, wherein the increase in throat area is such that the nozzle segment is configured to handle a 3% increase in a gas mass flow rate through the nozzle segment as compared to the nozzle segment without the throat area increase.

5. The nozzle segment according to claim 1, wherein the throat area is defined by a plane extending perpendicularly from the suction side of a blade to the trailing edge on the pressure side of an adjacent blade.

6. A method of increasing a gas mass flow rate through a nozzle segment, the method comprising:
   providing a nozzle segment including an inner platform configured to be connected with a casing of a gas turbine engine, an outer platform configured to be connected with the casing disposed apart from the inner platform in a radial direction of the gas turbine engine, and a plurality of blades disposed between the inner and outer platforms and connected thereto, each blade having a leading edge, a trailing edge, a suction side, and a pressure side; and
   removing material from a portion of one of an inside surface of the inner platform or from an inside surface of the outer platform outwardly along a radial direction extending from the leading edge of the blade the trailing edge of the blade and into a portion of the inside surface of the inner or outer platform that is proximate the trailing edge of the blade to form a scalloped region that extends from the pressure side of one of the plurality of blades to the suction side of an adjacent one of the plurality of blades in a uniform line having end points substantially equidistant from the rotation axis of the nozzle so as to increase a throat area of the nozzle segment;
   wherein the blades extend through the scalloped region to the inner platform and the outer platform.

7. The method according the claim 6, wherein the increase in the throat area is an increase in a radial annulus area of the throat and a distance from blade to blade remains unchanged.

8. The method according the claim 6, wherein the nozzle segment is an inlet guide vane segment.

9. The method according the claim 6, wherein the increase in throat area is such that the nozzle segment is configured to handle a 3% increase in a gas mass flow rate through the nozzle segment as compared to the nozzle segment without the throat area increase.

10. The method according the claim 6, wherein the throat area is defined by a plane extending perpendicularly from the suction side of a blade to the trailing edge on the pressure side of an adjacent blade.

* * * * *